Nov. 14, 1944.  W. H. GRIFFITH ET AL  2,362,629
AIRCRAFT COMPASS-CORRECTING APPARATUS
Filed June 7, 1943  3 Sheets-Sheet 1
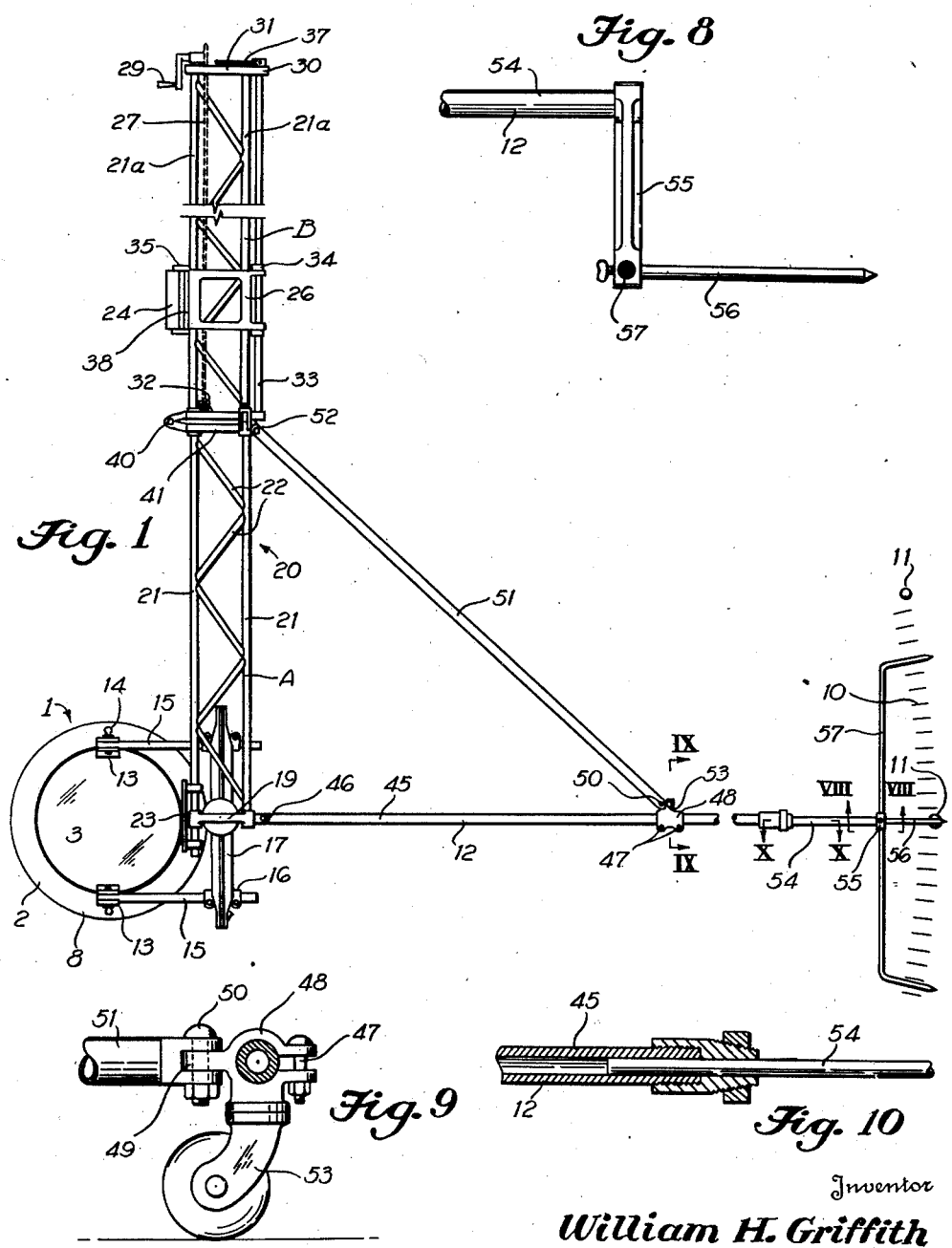
Inventor
William H. Griffith
Colburn J. Colby
By M. S. McDowell
Attorney

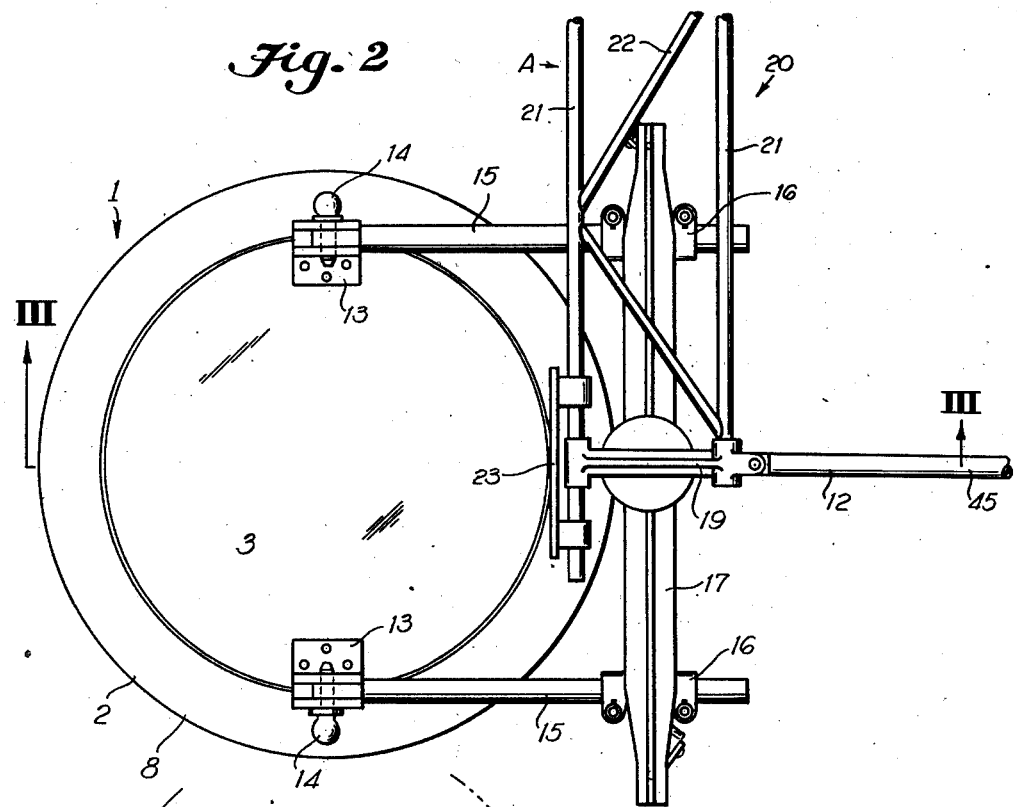
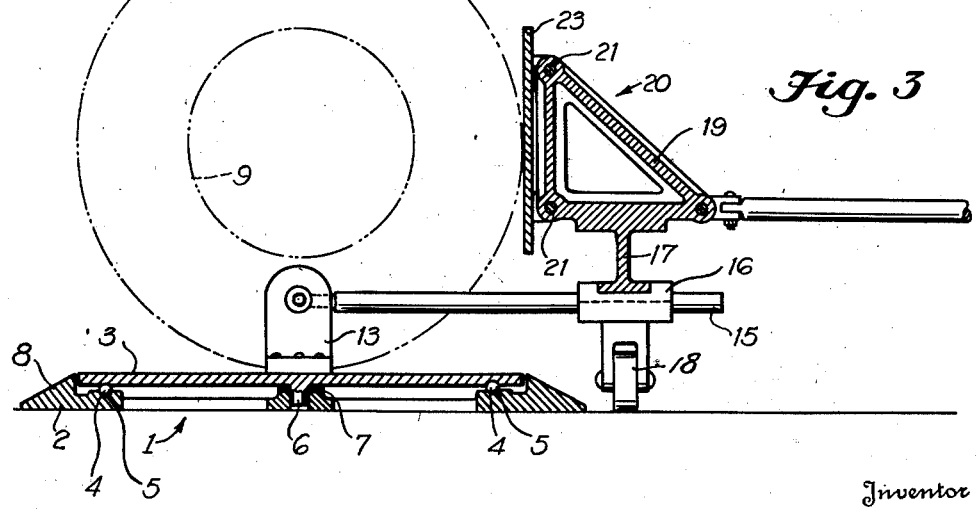

Nov. 14, 1944.    W. H. GRIFFITH ET AL    2,362,629
AIRCRAFT COMPASS-CORRECTING APPARATUS
Filed June 7, 1943    3 Sheets-Sheet 3
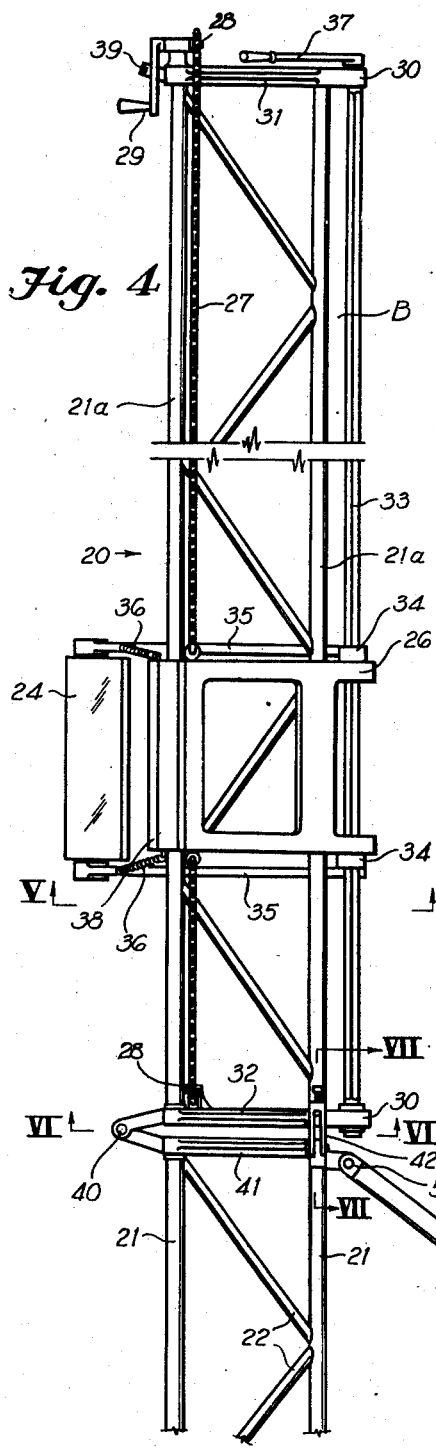
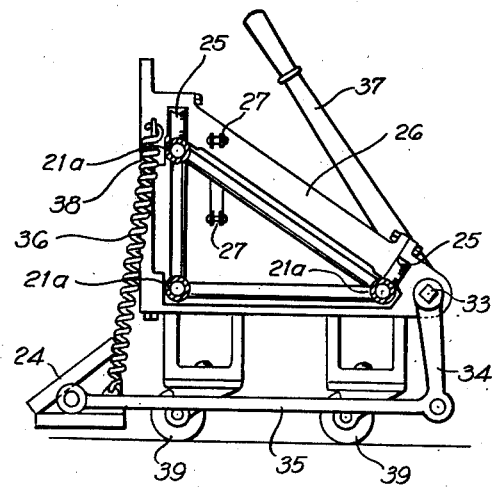
Fig. 5
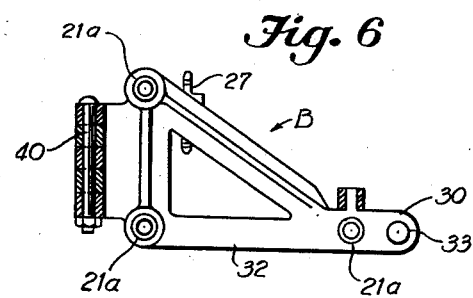
Fig. 6
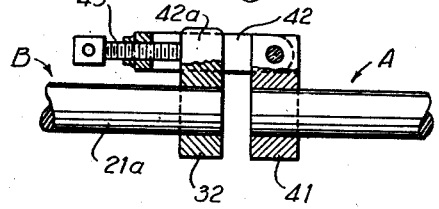
Fig. 7
Inventor
*William H. Griffith*
*Colburn J. Colby*
By *William S. McDowell*
Attorney Patented Nov. 14, 1944

2,362,629

UNITED STATES PATENT OFFICE 2,362,629

AIRCRAFT COMPASS-CORRECTING APPARATUS

William H. Griffith, Columbus, Ohio, and Colburn J. Colby, Corpus Christi, Tex., assignors to International-Stacey Corporation, Columbus, Ohio, a corporation of Ohio Application June 7, 1943, Serial No. 489,962

6 Claims. (Cl. 73—1)

The object of this invention is to provide apparatus to assist aerial navigators in correcting or compensating the magnetic compasses of aircraft. Frequent and accurate compensation of the magnetic compass to counteract an airplane's inherent magnetism, and other forces, so that compass deviation will be as small as possible is mandatory, not only for the guidance of aircraft, but to safeguard the lives of their occupants.

It is, therefore, another object of the present invention to provide an improved aircraft turntable and orientation index adapted for use in combination with a ground-laid compass rose so constructed as to permit of the turning of an airplane engaged therewith about a vertical axis forming the center of the rose, the arrangement permitting of close and accurate comparison of the magnetic compass with the usual points or rhumbs of the rose in order to provide a convenient means for checking the accuracy of the compass or to compensate the same for variable magnetic influences.

When cargo-carrying planes particularly are loaded for long distance flights, it is necessary, frequently, to correct the compasses of such planes to overcome the magnetic influences exerted on said compasses by metallic bodies present in the cargo. These bodies and effects vary with each loading of the airplanes and, when long distance flights are contemplated, accurate compensation of the compasses for such conditions is necessary.

In accordance with the present invention, such compass compensation, checking or correction, may be effected conveniently by the provision of a non-magnetic turntable which is adapted to rotate about a fixed vertical axis provided in the center of a ground-laid compass rose, that is, a circular figure having accurately ascertained geographical directions and degree graduations disposed thereon, the turntable permitting of the swinging or turning of an associated airplane about the axis of the rose, so that an orientation pointer or index, forming a part of the table, will be caused to traverse the graduations of the rose, thereby enabling the plane's pilot or navigator to compare with accuracy the indications of the compass with those of the ground-laid rose.

It is a further object of the invention to provide a combined turntable and orientation index for aircraft with a portable horizontally extending frame arranged in perpendicular relation to the longitudinal axis of the orientation index or pointer and adapted for rotary movement in unison with the turntable and the index or pointer, said frame carrying a longitudinally adjustable wheel chock which engages with one of the landing wheels of an associated airplane, the adjustment of the chock enabling the apparatus to be adapted to airplanes irrespective of variations in the transverse spacing of their landing wheels.

It is a further object of the invention to provide a turntable and orientation apparatus of the character set forth in which the various parts thereof may be disassembled or dismantled in order that such parts may be compactly arranged for storage and transportation purposes.

For a further understanding of the invention, reference is to be had to the following description and the accompanying drawings, wherein:

Fig. 1 is a plan view of an airplane turntable and orientation index apparatus constructed in accordance with the features of the present invention;

Fig. 2 is a similar view on a larger scale disclosing the turntable proper and its connected frame mechanism;

Fig. 3 is a vertical sectional view on the plane indicated by the line III—III of Fig. 2;

Fig. 4 is an enlarged plan view of the adjustable wheel chock and its supporting frame structure;

Fig. 5 is a vertical transverse sectional view taken through the chock and frame structure on the plane indicated by the line V—V of Fig. 4;

Fig. 6 is a similar view on the line VI—VI of Fig. 4;

Fig. 7 is a detail vertical sectional view taken on the plane indicated by the line VII—VII of Fig. 4;

Fig. 8 is a side elevational view of the index pointer;

Fig. 9 is a detail sectional view on the line IX—IX of Fig. 1;

Fig. 10 is a detail vertical longitudinal sectional view on the line X—X of Fig. 1.

Our improved compass-compensating apparatus for aircraft comprises a turntable unit 1. This unit consists of a lower stationary base plate 2 and a disk 3. Preferably, the latter is supported by antifriction devices 4 arranged in closely spaced order in a raceway 5 provided between the plate 2 and the disk 3. Also, if desired, the center of the disk may be formed with a depending stud 6 which is received for turning movement in a bearing 7 provided in the center of the plate 2. The outer peripheral edges of the base plate 2 are inclined as at 8 so that an airplane landing wheel 9 may readily ride over said surfaces and engage with the flat upper surfaces of the disk 3. Usually the base plate rests on a prepared foundation, such as concrete, asphalt or the like in which no metallic reenforcement is utilized.

Care in the selection of the site for the compass compensator would insure freedom from local magnetic influences which are present in such structures as steel buildings, reenforced concrete runways, ramps, taxi-ways, etc. Also, avoidance to proximity to all electrical apparatus, such as high tension lines, transformer stations and generating equipment, is highly desirable or necessary. The turntable is placed in the center of a ground-laid compass rose, indicated at 10. This rose should be laid out from true north by traverse from known accurate bearings, such as U. S. C. and G. S. monuments, reservation boundary monuments or by astronomical observation for the meridian. A true north bearing having been established, a north and south line should be definitely and permanently fixed. Preferably, each fifteen degrees of the rose degree graduations should be marked by setting a bronze plug, indicated at 11, on the circumference of the rose. Graduations to degrees and fractions should be provided in the vicinity of each plug.

The apparatus provides a pointer or index 12 which has its inner end mounted for turning movement in unison with the plate 2 of the turntable and its outer end disposed for travel over the graduations of the rose 10. One way for accomplishing this purpose consists in providing the upper surface of the plate 2 with a pair of spaced brackets 13, which carry removable pins 14 on which are fulcrummed for pivotal movement the inner ends of a pair of parallel bars 15. Clamped for longitudinal adjustment on the outer portions of these bars are split sleeves 16 which are carried by and depend rigidly from the outer and lower end portions of a cross bar 17. Also, the outer and lower portions of this cross bar carry foundation-engaging turntable casters 18.

Secured to the upper surface of the cross bar 17 at the center thereof is the inner end member 19 of a sectional, laterally extending, chock-carrying frame 20. This frame comprises an inner section A and an outer section B, the two sections being hingedly and detachably connected, in a manner to be hereinafter described, at their adjoining ends.

The inner section A of the frame 20 is provided with a plurality of triangularly arranged parallel, longitudinally extending rods 21, which are united at intervals by truss bracing, indicated at 22. The inner ends of rods 21 are stationarily positioned in sockets provided in the ends of the member 19. The vertically aligned rods 21, contiguous to the member 19, effect the support of a wheel-engaging or contact plate 23. This plate, as shown in Fig. 3, is arranged vertically immediately over the outer peripheral portion of the turntable 1, so that the landing wheel 9 of an airplane resting on the turntable will engage the outer surface of the contact plate, limiting the movement of the wheel in a forward direction. The plate is adjustable to accommodate landing wheels of different diameter by moving the sleeves 16 on the rods 15 or vice versa.

The other wheel of the airplane so positioned is adapted for engagement with a longitudinally adjustable chock 24 carried by the outer section B of the frame 20. The parallel rods 21a of the frame section B have engaged therewith the rollers 25 of a chock carriage 26. Movement of this carriage longitudinally of the frame B is obtained by the provision of an endless chain 27 which is united with the carriage and is trained around sprockets 28 rotatably supported in any suitable manner at the ends of the frame section B. The sprocket arranged at the outer end of the frame B is provided with a shaft which is connected with a manually rotated crank 29, whereby through the rotation of which, the operating positions of the carriage relative to the frame section B may be conveniently effected.

Rotatably supported in connection with bearings 30 formed with the end members 31 and 32 of the frame section B is a rock shaft 33. This shaft, except for the portions thereof supported in the bearings 30, is substantially square in cross section. Slidable with the carriage 26 and adapted for swinging movement upon partial rotation of the rock shaft, is a pair of depending crank arms 34. These arms, at their lower ends, are connected with links 35, the forward ends of said links being secured to the wheel chock 24. Normally, the chock 24 is supported by springs 36 above the foundation surface and in a retracted position. The chock, however, may be advanced by rocking the shaft 33. This may be accomplished through the actuation of a manually operated lever 37 fixed to the outer end of the shaft 33. The chock is arranged in registration with a second wheel-engaging or contact plate 38, which is mounted vertically upon one side of the carriage 26. It will be seen that by the adjustment of the carriage 26 longitudinally of the frame section B, the chock and the plate 38 may be brought into registration with the second landing wheel of an airplane having its first wheel arranged on the base plate 2 of the turntable, the adjustment of the carriage being easily effected to adapt the chock to the different gauge-spacing of the landing wheels of various aircraft.

When the inclined outer face of the chock is engaged by an airplane landing wheel, the chock is forced downwardly, against the resistance of the springs 36, into engagement with the upper surface of the foundation, thereby holding the airplane against undesired rotation with its motors in operation. When the chock is retracted, however, the table and its associated frame structure may be rotated freely under plane power. This movement is facilitated by providing the outer end of the frame section B with casters 39.

The end member 32 of the section B is hingedly connected as at 40 with the complemental end 41 provided at the outer end of the frame section A. To lock the end members 32 and 41 together and make the frame sections A and B in longitudinal alignment, the member 41 is provided with an upstanding ear to which is pivoted a link 42. This link is adapted to receive an upstanding ear 42a provided on the member 32. Through the rotation of a manually operated screw 43, sufficient pressure may be brought to bear on the link and the upstanding ear of the member 32 to retain positively the two frame sections in united relationship. The hinge connection 40 is such that the frame sections A and B may be adjusted relatively to adapt the same to aircraft employing tricycle types of landing wheels.

The pointer or orientation index 12 has its longitudinal axis disposed at right angles to that of the frame 20, as shown in Fig. 1. The said pointer or index, in a preferred form of my invention, comprises a bar 45 having its inner end pivotally connected as at 46 to the end member 19 of the frame section A. Intermediately of its length, the bar 45 has clamped thereto, as at 47, a sleeve member 48. The latter is formed with an apertured ear 49 which is pinned as at 50 to one end of a diagonally extending bar 51, the other end of the bar 51 being connected as at 52 to the end member 41 of the frame section A, thereby maintaining the index bar at right angles to the longitudinal axis of the frame 20. The sleeve member 48 carries a depending caster 53 for its further support. The outer end of the bar 51 carries a removable and longitudinally adjustable rod 54, the outer end of the latter carrying a depending bracket 55, from the lower end of which projects a primary pointer 56, the latter being disposed in registration with the graduations of the compass rose 10. Also, clamped to the lower end of the bracket 55 is the intermediate portion of a variation pointer 57, which is used for setting off variations between the true north and the magnetic north.

When an airplane is moved into juxtaposition with a compass rose, the longitudinal center line of its fuselage should be kept as nearly parallel to the north-south line as is practicable. The right hand landing wheel of the airplane should then be centered on the non-magnetic turntable. Such centering is desirable, but is not essential, as lack of centering introduces no error. The frame 20 is adjusted so that its contact plates 23 and 38 bear equally against both of the main landing wheel tires. This may be conveniently effected inasmuch as the main landing wheels on airplanes are accurately centered on a line drawn at right angles to the center line of such aircraft. The pointer or index 12 being parallel to the longitudinal axis of the aircraft, the latter may be swung under its own power, or otherwise, to any desired heading, true or magnetic, by bringing the pointer or index to a desired reading or position over the graduations of the compass rose. If magnetic headings are desired, the variation pointer 57 may be set to indicate plus or minus by sliding the same right or left to the proper reading with the center pointer 56 indicating true north. A plus variation is set off with the westward leg of the variation pointer 57 and a minus variation with the eastward leg. By use of the variation pointer, an aircraft may be placed on any desired magnetic bearing.

In view of the foregoing, it will be seen that our improved apparatus may be used, among others, in the following operations:

(a) To compensate magnetic compasses;
(b) To check previous compensations;
(c) To swing aircraft for residuals;
(d) As a routine check and to determine compass error due to temporary deviations caused by unusual conditions; and
(e) As a routine determination of compass error due to cargo of magnetic materials, i. e., bombs, ammunition, etc. Further, the apparatus provides a simple, practical and accurate means for swinging aircraft. The apparatus can be adopted for routine use at the beginning of every flight, and at way stops where conditions of loading may indicate a change in compass error.

We claim:

1. Apparatus for correcting the readings of the magnetic compasses of aircraft comprising a turntable adapted for engagement with one of the main landing wheels of an airplane, a horizontally extending frame movable with said turntable, said frame having its longitudinal axis disposed substantially at right angles to that of an airplane engaged with said turntable, a wheel chock supported for longitudinal adjustment on said frame, said chock being adapted to be engaged by the second landing wheel of an airplane positioned on said turntable, and a pointer projecting from said frame and having its longitudinal axis arranged at right angles to the corresponding axis of said frame.

2. Apparatus for turning airplanes comprising a turntable unit having a rotatably supported disk for the reception of an airplane landing wheel, spaced parallel bars secured to said disk, a cross bar mounted for longitudinal adjustment on said parallel bars, a frame supported by said cross bar, and a wheel-engaging contact plate mounted on said frame above the turntable unit.

3. Apparatus for turning airplanes comprising a turntable unit having a rotatably supported disk for the reception of an airplane landing wheel, spaced parallel bars secured to said disk, a cross bar mounted for longitudinal adjustment on said parallel bars, a frame supported by said cross bar, a wheel-engaging contact plate mounted on said frame above the turntable unit, and ground-engaging casters carried by the outer ends of said cross bar.

4. Apparatus for turning airplanes comprising a turntable unit having a rotatably supported disk for the reception of an airplane landing wheel, spaced parallel bars secured to said disk, a cross bar mounted for longitudinal adjustment on said parallel bars, a frame supported by said cross bar, a wheel-engaging contact plate mounted on said frame above the turntable unit, a horizontally disposed indexing pointer having its inner end connected with said frame, and wheeled-supporting means for the outer portions of said pointer.

5. Apparatus for swinging airplanes comprising a turntable unit having an airplane wheel-engaging member turnable about a vertical axis, a wheeled horizontally extending elongated frame turnable in unison with the rotatable member of the turntable unit, a carriage movable longitudinally of said frame, manually operated means for regulating the operating positions of said carriage with respect to said frame, and airplane wheel-engaging means movably supported by said carriage.

6. Apparatus for swinging airplanes comprising a turntable unit having a ground-engaging base section and a rotatable top section adapted for the reception of one of the landing wheels of an airplane, an elongated horizontally extending frame turnable in unison with the top section of the turntable unit, said frame being arranged so that its longitudinal axis is substantially at right angles to the center line of an airplane engaged with the turntable unit, a carriage supported for longitudinal movement on said frame, manually operated means for adjusting said carriage longitudinally of said frame, a wheel chock movably supported by said carriage, said chock being adapted for engagement with the second landing wheel of an airplane engaged with said turntable unit, and manually operated means for advancing or retracting said wheel chock by movement thereof transversely of said frame.

WILLIAM H. GRIFFITH.
COLBURN J. COLBY.